United States Patent [19]

Huestis et al.

[11] Patent Number: 5,447,551
[45] Date of Patent: Sep. 5, 1995

[54] METHOD AND APPARATUS FOR THE REMOVAL OF HYDROGEN SULFIDE FROM A PROCESS GAS STREAM

[75] Inventors: Allan C. Huestis, Georgetown, S.C.; Charles W. Sanzenbacher, Charlotte, N.C.

[73] Assignee: Georgetown Steel Corporation, Georgetown, S.C.

[21] Appl. No.: 289,846

[22] Filed: Aug. 12, 1994

Related U.S. Application Data

[63] Continuation-in-part of Ser. No. 69,028, May 28, 1993, Pat. No. 5,340,378.

[51] Int. Cl.$^6$ ............................................. C21B 13/02
[52] U.S. Cl. ................................... 75/414; 75/496; 75/627; 75/629; 266/99; 266/156
[58] Field of Search ................. 75/414, 496, 627, 629; 266/99, 156

[56] References Cited

U.S. PATENT DOCUMENTS 5,340,378  8/1994  Huestis ................................. 75/414

Primary Examiner—Melvyn Andrews
Attorney, Agent, or Firm—Ralph H. Dougherty

[57] ABSTRACT

An improved method and apparatus for forming metallized iron by direct reduction of particulate iron oxide is disclosed. Spent reducing gas is recycled from the reduction furnace through a cooler-scrubber and a catalyst-containing stoichiometric gas reformer. Upon removing the process gas from the cooler-scrubber, it is contacted with a chlorine dioxide spray, then compressed and cooled, the sulfur compound removed, and the process gas recycled either into the furnace cooling zone, or directly into the reformer, or divided and directed into both uses. Thus, most of the sulfur containing components of the spent reducing gas are removed, thereby reducing the sulfur contamination of the gas reformer catalyst. Reducing sulfur contamination of the gas reformer catalyst improves the overall efficiency of the direct reduction process. Either high sulfur ores, or high sulfur process gas, or both can be utilized in the invented process.

18 Claims, 3 Drawing Sheets

METHOD AND APPARATUS FOR THE REMOVAL OF HYDROGEN SULFIDE FROM A PROCESS GAS STREAM

CROSS REFERENCE TO RELATED APPLICATION

This application is a continuation-in-part of U.S. patent application Ser. No. 08/069,028, filed May 28, 1993, now U.S. Pat. No. 5,340,378 by Allan C. Huestis.

FIELD OF THE INVENTION

The present invention relates to a method and apparatus for the removal of hydrogen sulfide from an $H_2S$-laden process gas stream, especially in the direct reduction of metallic oxides, and producing a metallized product having a very low sulfur content. The invention is particularly useful in the direct reduction of iron.

BACKGROUND OF THE INVENTION

Direct reduction processes for producing metallized iron from iron oxide pellets, lump ores, or similar materials which include iron oxide, are widely known and used in the steel industry. Iron ores always contain a small percentage of sulfur in the form of iron sulfide. Suitable direct reduction processes for forming metallized iron are disclosed in U.S. Pat. Nos. 3,128,174 and 3,881,916. In a direct reduction process such as the Midrex Direct Reduction Process, pellets of metal oxides and/or lump ores are charged into the top of a shaft furnace to establish gravitational flow therethrough. Reducing gas consisting essentially of carbon monoxide and hydrogen is heated to sufficient temperature to effect direct reduction. The hot reducing gas is introduced to the metal oxide burden in the furnace, ascends through the burden in counter-flow relation to the gravitationally descending burden, and reacts with the burden, forming metallized pellets and a reacted top gas consisting principally of carbon dioxide and water along with some unreacted gaseous reductants, which are drawn off as sulfur-containing spent top gas. The resulting hot metallized product descends into the cooling zone of the furnace wherein it is cooled by contact with cool gas injected into the cooling zone. Cold direct reduced product is discharged from the bottom of the furnace.

Additionally, U.S. Pat. No. 3,748,120 discloses a shaft furnace direct reduction process in which spent reduction gas is catalytically reformed from a mixture of gaseous hydrocarbon and spent reducing gas from the reduction process. In this process the spent reducing gas is cleaned and cooled upon exiting the reduction furnace and prior to being introduced into a catalyst containing reformer. In the direct reduction process the reducing gas passes through and reacts with the burden to produce sulfur containing gases which are treated to become process gas. These sulfur-containing gases contaminate the catalyst in the reformer. Sulfur contamination of the catalyst lowers the overall efficiency of the process. Processes for reducing the sulfur level in the recycled spent reducing gas by increasing the metallic ion content of the scrub water utilized by the cooler-scrubber are also known.

The present invention provides an improved method and apparatus for reducing the sulfur contamination of the gas reformer catalyst by removing sulfur compounds from the spent process gas stream by reaction with chlorine dioxide prior to reintroduction of the process gas into the hot gas reformer.

Heretofore, direct reduction processes have required low sulfur fuel as process feed gas. The invention also comprehends a method and apparatus for removing sulfur compounds from sulfur-containing feed gas, such as coke oven gas, producer gas, natural gas, and carburetted water gas.

DESCRIPTION OF THE PRIOR ART

Applicant is aware of the following U.S. Patents concerning the use of chlorine dioxide.

| U.S. Pat. No. | Issue Date | Inventor | Title |
|---|---|---|---|
| 4,430,228 | 02-07-1984 | Paterson | PROCESS FOR REMOVING DISSOLVED IRON FROM WATER |
| 4,451,361 | 05-29-1984 | Paterson | APPARATUS FOR REMOVING DISSOLVED IRON FROM WATER |
| 4,629,502 | 12-16-1986 | Sherman | PRESSURIZED REACTION OF REFRACTORY ORES WITH HEAT RECOVERY |
| 4,902,408 | 02-20-1990 | Reichert | PROCESS FOR REMOVING HYDROGEN SULPHIDE USING METAL COMPOUNDS |
| 4,941,917 | 07-17-1990 | Cenegy | PROCESS FOR RECOVERY OF PRECIOUS METALS FROM CARBONACEOUS ORES USING CHLORINE DIOXIDE |

Reichert teaches that chlorine dioxide is known for the purpose of removing hydrogen sulfide in the processing of oil and oil products in refineries or petrochemical plants. Reichert states that chloride dioxide is a toxic substance requiring special handling, as well as being corrosive and of low efficiency where low hydrogen sulfide contents are to be treated.

Sherman teaches a pressure hydrometallurgy process in which an ore containing slurry is oxidized to break the metal-sulfur bonds by introducing a heated liquid containing oxidizing elements such as oxygen or chlorine dioxide to flow through the slurry. This process produces sulfuric acid as a byproduct.

Both of the Patterson Patents utilize chlorine dioxide to oxidize soluble ferrous iron which has been dissolved in water, such as well water.

Cenegy teaches a method for destroying or reacting organic carbon in a carbonaceous ore containing precious metals by forming a slurry of the ore and contacting it with an aqueous solution of chlorine dioxide.

In each of the references above, other than Reichert, chlorine dioxide is reacted with an ore of a metallic substance. In the Reichert reference, hydrogen sulfide is removed from oil and oil products.

SUMMARY OF THE INVENTION

The invention provides both a method and apparatus for removing hydrogen sulfide from a process gas stream in the direct reduction of metals, particularly iron. In the present invention, hydrogen sulfide containing spent reducing gas from an ore reduction furnace is treated with chlorine dioxide before it comes into contact with metallized product, such as metallized iron material. Chlorine dioxide in aqueous solution is sprayed into a stream of removed top gas after which the stream passes through a compressor, then the fluids are removed and the sulfur-lean gas stream passes into the cooling zone of the shaft furnace, or directly into a process gas reformer.

Upon removing the process gas from the scrubber-cooler, it is contacted with a chlorine dioxide spray, then compressed and cooled, the sulfur compound removed, and the process gas recycled either into the furnace cooling zone, or directly into the reformer, or divided and directed into both uses. Thus, the sulfur containing components of the spent reducing gas are lowered, thereby reducing the sulfur contamination of the gas reformer catalyst. Reducing sulfur contamination of the gas reformer catalyst improves the overall efficiency of the direct reduction process.

The desulfurizing apparatus consists of a source of sodium hypochlorite (NaOCl), a source of sodium chlorite ($NaClO_2$), a source of hydrochloric acid (HCl), a source of water, a pump, a chlorine dioxide ($ClO_2$) generator, and injection means such as a nozzle. Control and monitoring devices are also utilized, as required.

The invented process is applied to either of two direct reduction gas flow arrangements or flow sheets. These are designated (1) the Standard Flow Sheet (SFS), as depicted in U.S. Pat. No. 3,748,120, and (2) the Alternate Flow Sheet (AFS), as depicted in U.S. Pat. No. 3,749,386. In the former, cleaned, cooled spent reducing gas is recycled to a catalytic reformer for reforming to reducing gas. In the latter, cooled, cleaned spent reducing gas is introduced to the cooling zone of a shaft furnace as cooling gas, which also acts to desulfurize the gas, before being introduced to the reformer for catalytic reforming to reducing gas.

Iron ores always contain a small percentage of sulfur in the form of iron sulfide. During reduction, a portion of this sulfur is liberated and mixed into the reducing gas stream. In either gas flow sheet, spent reducing gas exiting the top of the furnace contains some $H_2S$. In the SFS, this gas becomes the process gas which is conducted to the reformer wherein it is reformed, generally along with methane, to produce $H_2$ and CO reductants. Reformer catalyst is very sensitive to $H_2S$ and thus the SFS use is generally limited to ores containing no more than a maximum of 0.004% sulfur.

In the AFS, spent gas from the reducing furnace containing $H_2S$ is cooled and passed through the cooling zone of the furnace. Because of the affinity of hot iron for sulfur, the cooling direct reduced product strips $H_2S$ from the gas, which becomes sulfur-lean or sulfur-free process gas and is delivered to the reformer. The removed sulfur is discharged along with the DRI product. The AFS generally can handle ores containing up to 0.007% sulfur without raising sulfur in the direct reduced product to a level undesirable to steelmakers.

The AFS has greater tolerance for higher sulfur contents and allows the operator to achieve maximum DRI tonnes/hour production with its gas compressors.

In general, the higher the sulfur content of iron ore, the lower its cost. It is therefore desirable to be able use ores containing more sulfur than the 0.007% that steelmakers will tolerate. Several methods have been suggested (and some actually tried) to strip $H_2S$ from process gas without discharging the sulfur with the DRI product, as happens with the AFS. None of these processes have been cost effective. For example, one such process passes the process gas through a vessel containing ZnO, wherein $H_2S$ reacts to form ZnS. The stripped process gas then flows to the reformer. While this process works, its capital cost is high, pressure drop is appreciable, and the ZnS must be regenerated or disposed of in an environmentally acceptable manner.

The present invention allows direct reduction plants which require only low sulfur fuel to use high sulfur fuel (which contain organic sulfurs) as process feed gas. Until the present invention, high sulfur fuels, such as coke oven gas (COG), could only be converted to low sulfur fuels by very expensive, catalytic/absorption processes. This has prevented their use in Midrex plants. The invented process provides a low capital cost, low operating cost desulfurizing means which makes practical the use of such high sulfur fuels in direct reduction.

The present invention strips $H_2S$ from the process gas in a process having low capital cost, low operating cost, no increase in pressure drop, and with environmentally acceptable waste products.

OBJECTS OF THE INVENTION

The principal object of the invention is to provide an improved method of removing sulfur compounds from spent process gas in the direct reduction of metal ores.

A further object of this invention is to provide a method for direct reduction of sulfur-containing metal ores which results in a low-sulfur metallized product.

Another object of the invention is to provide apparatus for direct reduction of sulfur-containing metal ores which reduces sulfur contamination of the metallized product.

Another object of the invention is to provide a method and apparatus for direct reduction of sulfur-containing metal ores which reduces sulfur contamination of catalyst in an associated stoichiometric reformer.

Another object of the invention is to provide a method and apparatus for direct reduction of metal ores using high-sulfur process gas.

Another object of the invention is to provide a method and apparatus for desulfurizing high sulfur gas (e.g., COG) in an economic manner.

BRIEF DESCRIPTION OF THE DRAWINGS

The foregoing and other objects will become more readily apparent by referring to the following detailed description and the appended drawings in which.

DETAILED DESCRIPTION

Although the invention is suitable for use in reduction of other metal oxides, it will be described with regard to iron. In addition, although the invention is suitable for use in removing essentially all sulfur compounds, it will be described with regard to hydrogen sulfide ($H_2S$). Chlorine dioxide gas is a powerful oxidizer. In the present invention, chlorine dioxide is injected into $H_2S$-laden process gas streams of a direct reduction plant to oxidize $H_2S$ to a water soluble sulfate. The soluble sulfate is then flushed from the gas stream with water, leaving $H_2S$-depleted gas to be reformed, as in the SFS or to pass through the cooling zone without depositing sulfur on the DRI product prior to reforming as in the AFS.

The sulfate-containing flush water flows into the plant process water clarifier. Waste products resulting from the gas desulfurizing reaction are discharged with clarifier underflow or with the cooling tower cooling water as sulfate (calcium) and NaCl (salt), both of which are environmentally benign.

Injecting chlorine dioxide gas into process compressor flush-water is the preferred way to react $ClO_2$ gas and $H_2S$. Violent agitation within the compressor provides intimate contact of the gases, and provides sufficient reaction time to quantitatively oxidize all the $H_2S$ or reduce all the $ClO_2$, depending on whether $H_2S$ or $ClO_2$ is present in excess. It is desirable to maintain 2 to 5 ppmv $H_2S$ in the process gas; therefore, less $ClO_2$ is injected than is stoichiometrically necessary.

Figure 3:
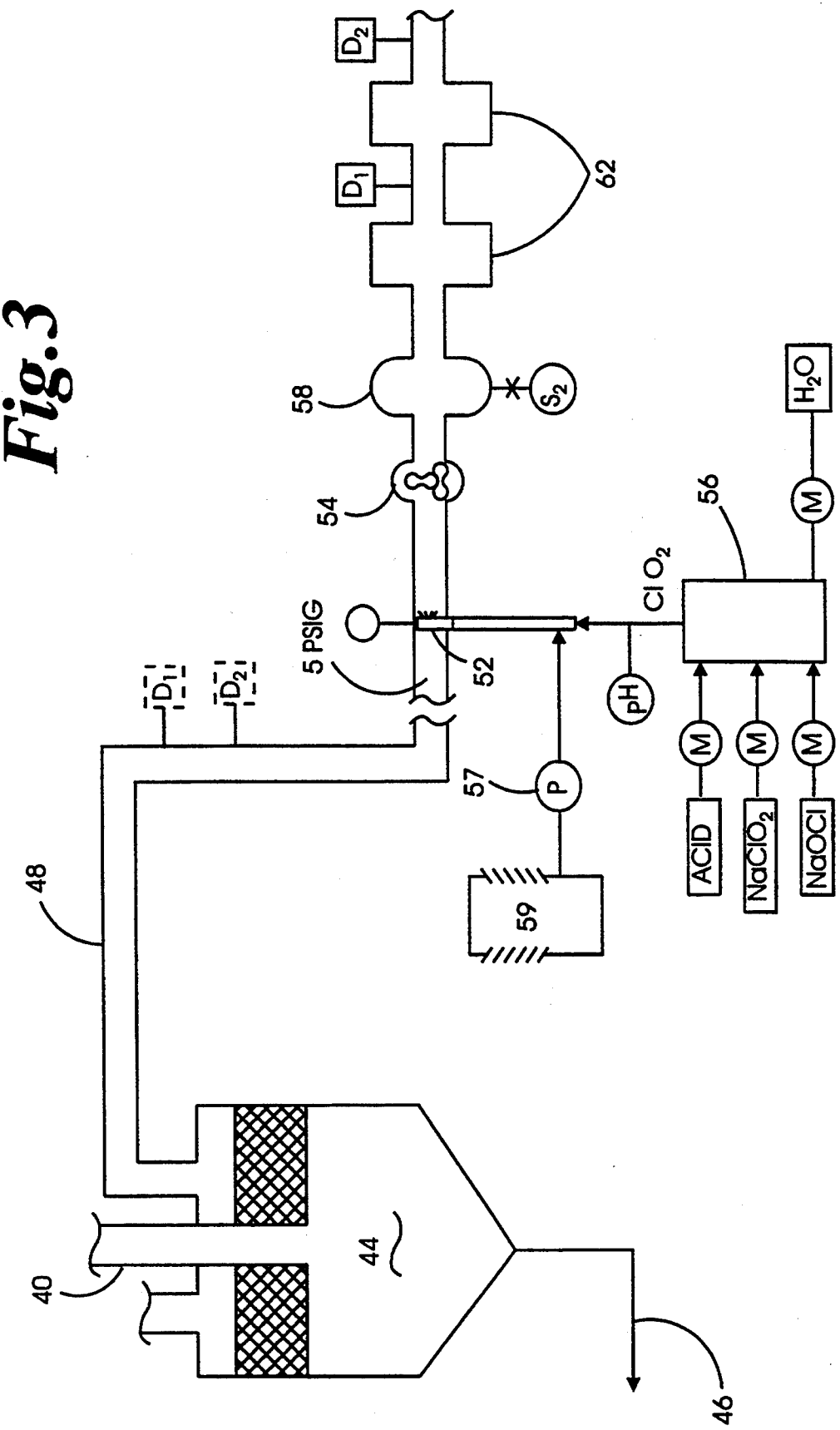
FIG. 3 is a schematic diagram of the sulfur removal equipment for operating and testing the invented process.

FIG. 3 shows the equipment arrangement for injecting $ClO_2$ in accordance with the invented process. Tests have shown that $ClO_2$ injected in accordance with this invention removes $H_2S$ from the gas stream with no residual $ClO_2$ remaining in the stream. Neither $H_2S$ nor chlorine compound gases were detected in the gas beyond the gas cooler, nor downstream of the compressor. This proved that the process is economic from a chemical cost standpoint. Capital cost is negligible, only a simple $ClO_2$ generator is required and no direct reduction plant equipment changes are needed.

The capability is provided for measuring the $H_2S$ content of the gas after exiting the compressor (or the humidifier/cooler 62) and controlling the rate of $ClO_2$ injection to maintain a concentration of 2 to 5 ppmv $H_2S$ in the treated gas stream to (1) insure that no residual $ClO_2$ or chlorine compound gases reach the reformer or process gas heat exchangers, and (2) insure that some $H_2S$ is present in the process gas entering the reformer to protect the reformer catalyst from potential carbon degradation. At the compressor water discharge point 60 from the silencer 58, the discharge water is sampled for chlorine content and for pH as well as for $H_2S$. Just beyond the aftercooler 62 is a monitoring point D2 for detecting chlorine and $H_2S$ in the gas stream.

Chlorine dioxide gas is produced as shown in FIG. 3 by reacting sodium chlorite (bleach), sodium hypochlorite and hydrochloric acid. International Dioxide, Inc., of Clark, N.J., supplies generators and chemicals to paper mills, dye and other chemical plants to deodorize gas streams. All these applications involve flue gas, which is highly oxidizing. Using $ClO_2$ in the reducing and iron dust-laden gas stream present in a process for direct reduction of metal oxides, injecting it in the manner set forth above, and causing the reaction to occur within a compressor were all heretofore unknown.

In addition to improving the performances of Midrex direct reduction plants producing cold DRI via either the SFS or AFS methods, the invention is especially useful for plants producing hot briquetted iron, know as HBI. In the HBI operation, ore is reduced to DRI in the reduction zone of the furnace, as above, but is not cooled. DRI is discharged hot into briquetting presses to form pillow shaped briquets. In such plants, there is no cooling zone wherein $H_2S$ could be removed from the process gas stream using AFS concept. Therefore, HBI Plants are restricted to using the more expensive low sulfur ores. The use of the subject invention to strip $H_2S$ from process gas to the reformer gives HBI plants an economical way to use cheaper ores.

Figure 1:
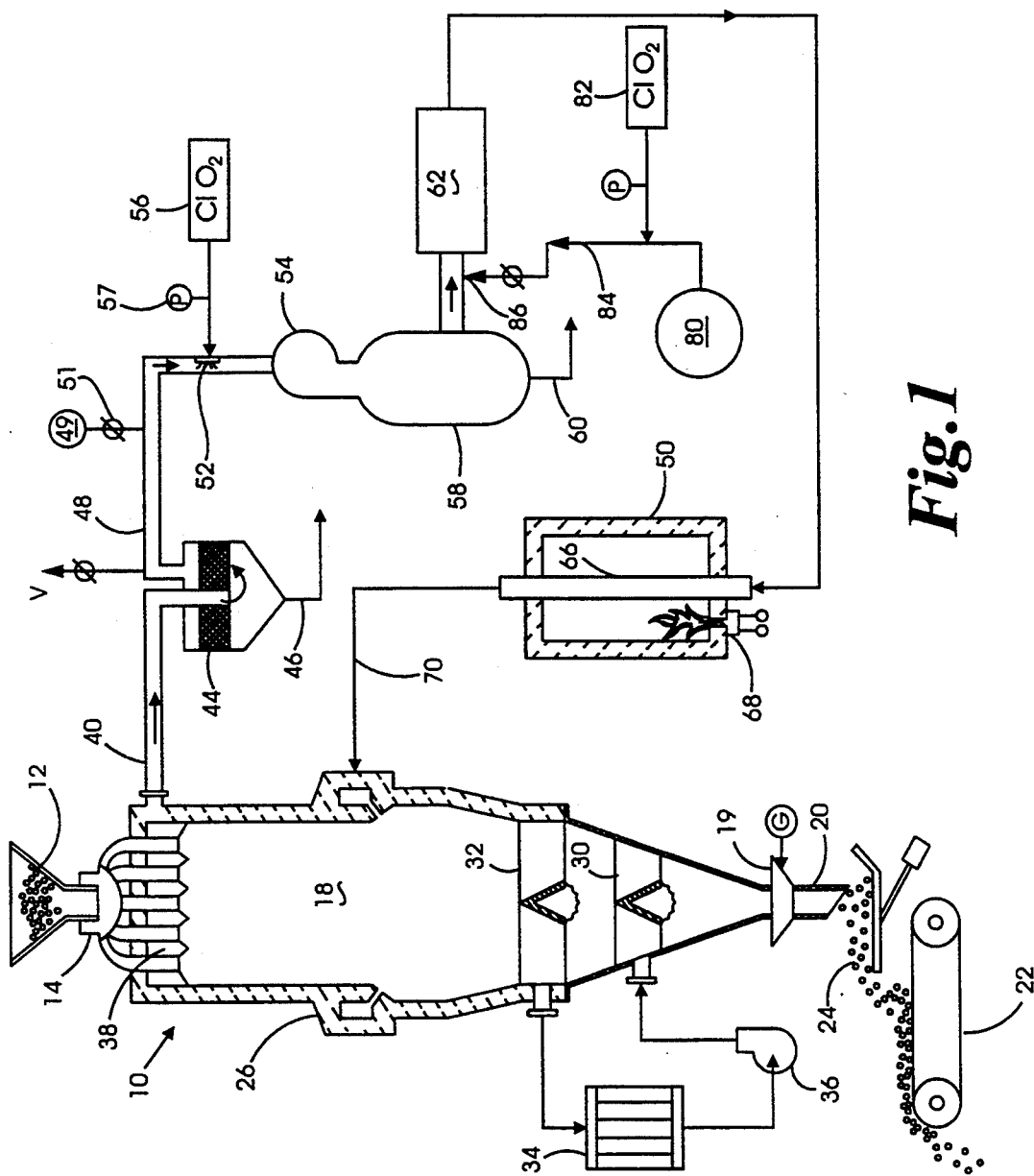
FIG. 1 is a schematic diagram of a vertical shaft furnace and its associated equipment for producing metallized iron in accordance with the preferred embodiment of the invention.

Referring now to FIG. 1, a vertical shaft furnace 10 has a feed hopper 12 mounted thereon and connected thereto by a gas seal 14 into which iron oxide, such as iron oxide pellets, lump ore, or similar material is fed. The force of gravity causes the iron oxide to flow into the shaft furnace through the gas seal to form a packed bed burden 18 within the shaft furnace. As is conventional, metallized iron, preferably in the form of pellets or lumps, descends through the furnace, exiting through a lower gas seal 19 and discharge pipe 20, and is removed by conveyor 22. Gas from source G provides the seal gas. Adding particulate iron oxide material to the hopper 12 establishes a gravitational flow through the shaft furnace 10 comprising an input of iron oxide material and an output of particulate metallized iron 24.

The furnace 10 is surrounded by a bustle and tuyere system, generally illustrated at 26, through which reducing gas is introduced into the furnace 10. The portion of the furnace from the bustle and tuyere system 26 to the top of the burden 18 constitutes the reducing zone. The lower portion of the furnace is shown with an optional cooling zone, which contains a lower cooling gas distributor 30, and an upper cooling gas collector 32 which defines a cooling zone therebetween. Collector 32 and distributor 30 are connected to gas cooler 34 and pump/compressor 36 in a closed loop for recirculating the cooling gas through the cooling zone. Reacted or spent reducing gas is removed from plenum 38 in the upper portion of the furnace 10 through a gas take off pipe 40. The take-off pipe 40, through which spent reducing gas leaves the furnace feeds gas to a cooler scrubber 44. The cooler scrubber 44 can be a conventional venturi scrubber surrounded by an annular or sectional packed bed cooler and employing a recirculating scrub water system. The spent reducing gas flows downward through the venturi and upwardly through the packed bed through which scrub water descends, providing intimate contact of the spent reducing gas with the scrub water.

Waste (used) scrub water is removed from the cooler scrubber 44 along with entrained particulates as underflow 46. Particulate material removed from the waste water is discharged as solid waste and removed using any convenient means. Excess gas from the cooler scrubber can be removed from the system at vent V, from which it can be stored for later use, or sold.

Cooler scrubber 44 is coupled through pipe 48 to the inlet of a catalyst-containing reformer 50. A spray nozzle 52 in the pipe 48 injects an aqueous solution of chlorine dioxide into the pipe adjacent compressor 54 to contact the cooled process gas directly, reacting with the $H_2S$ therein to form a water-soluble sulfate. The nozzle 52 is connected to a chlorine dioxide generator 56, which is in turn connected to sources of sodium hypochlorite, sodium chlorite, hydrochloric acid, and water. Pump 57, connected to water cooling tower 59, provides the necessary pressure to form the spray for injection. Meters M are provided for monitoring and control of the process. The process gas with entrained sulfates is compressed in compressor 54, after which it passes through a baffle containing chamber or silencer 58, from which water and sulfates are discharged at 60.

After passing through humidifier/aftercooler 62, the process gas is introduced to the reformer 50. When using the alternate flow sheet (AFS) the humidifier/aftercooler 62 chills the gas by utilizing cold water therein. In the standard flow sheet, the humidifier/aftercooler 62 acts as a humidifier of the gas by using hot water, because some $H_2O$ is required for reforming of the spent reducing gas in the reformer. The humidifier/aftercooler also acts as a secondary scrubber.

Stoichiometric gas reformer 50 includes a plurality of indirect heat exchanger catalyst-containing tubes 66 positioned therein, which are heated by burners 68 using any convenient fuel. Hot reducing gas flows from the catalyst tubes 66 of the reformer 50 to the bustle and tuyere system 26 through pipe 70.

The catalyst in tubes 66 in the reformer includes active ions such as nickel oxide which are believed to provide "active sites" in the course surfaces of the catalyst carrier. Catalyzation is thought to take place at or near the active sites (see Roberton, AFP Catalyst of Gas Reaction by Metal, Logas, (1970). Sulfur compounds mask or reduce the activity of these active sites. An excess of sulfur adhering to the sites in the catalyst carrier will reduce catalyst effectiveness by reducing the area or number of active sites. Thus, the presence of sulfur can poison the catalyst. The disclosed process and apparatus removes sulfur from the spent reduction gas thereby reducing the sulfur contamination of the active sites of the catalyst. Reducing the sulfur contamination of the catalyst improves the efficiency of the process.

It has been demonstrated that the system illustrated in FIG. 1 substantially lowers the sulfur content of the spent process or reducing gas, the result being less sulfur contamination of the iron product discharged from the furnace.

ALTERNATIVE EMBODIMENTS

Figure 2:
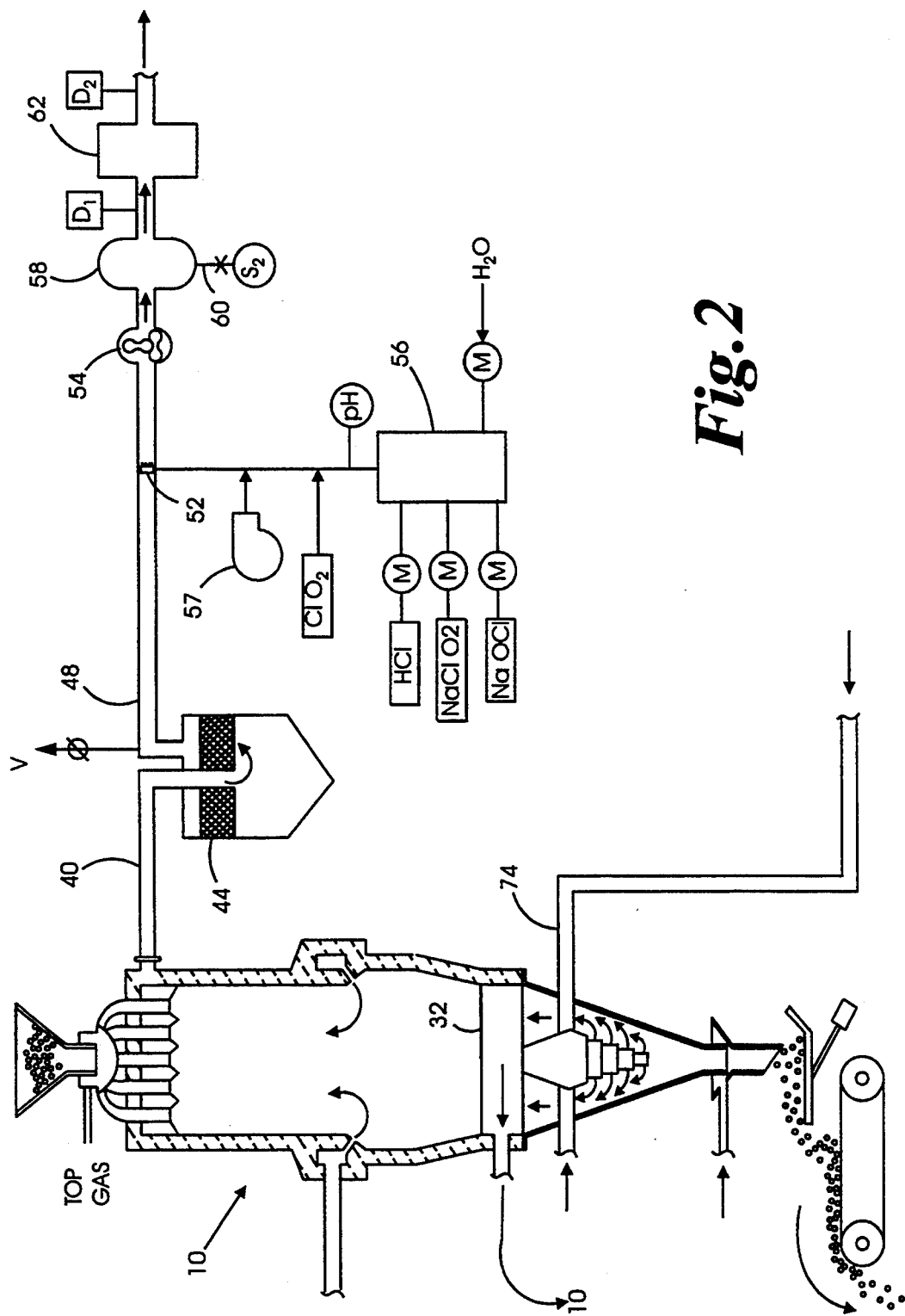
FIG. 2 is another schematic diagram similar to FIG. 1, but illustrating an alternative embodiment of the invention.

FIG. 2 illustrates an alternative embodiment of the invention. This embodiment is essentially identical with the embodiment previously discussed with reference to FIG. 1, except that the sulfur-lean process gas is first introduced into the cooling zone of the furnace through line 74 as cooling gas, then is introduced to the reformer.

In this embodiment, the sulfur is removed from the process gas in the same manner as the embodiment of FIG. 1, thus leaving the cooled product substantially sulfur-free, as no sulfur is present in the cooling gas for removal by the hot pellets.

EXAMPLE

Reagents in the amount of 25% by weight of sodium chlorite, 12% by weight of sodium hypochlorite, and 36% by weight of hydrochloric acid were fed to a chlorine dioxide generator in a feed mix of about 1/1/0.2, mixed with water, then the resulting solution was injected directly into the spent reducing gas in pipe 48 at or near the gas entrance to compressor 54. It was found that about 3.17 pounds of chlorine dioxide is used per pound of hydrogen sulfide, but it can vary from about 2.1 to about 3.9 pounds $ClO_2$ per pound of $H_2S$. This is substantially less than the 4.9 pounds chlorine dioxide per pound of hydrogen sulfide expected to be required from the teachings of available literature.

Two additional alternative embodiments are shown in FIG. 1. High sulfur process gas, such as coke oven gas, from source 49 can be introduced through valve 51 into pipe 48. Spray nozzle 52 in the pipe 48 injects an aqueous solution of chlorine dioxide from generator 56 into the pipe adjacent compressor 54 to contact the process gas, which results in desulfurizing the process gas, and excellent mixing of the gases in the compressor 54.

Alternatively, high sulfur process gas from source 80 is desulfurized in the same manner as set forth above by injection of an aqueous solution of chlorine dioxide from generator 82 into pipe 84, then the sulfur-lean gas is injected into the system at point 86 near the exit end of the silencer prior to the humidifier 62.

Coke oven gas is an organic hydrocarbon particularly containing thiophene which has to be converted to $H_2S$ before it can be removed in a conventional system. Thiophene ($C_4H_4S$) must be removed from the coke oven gas by catalytic conversion to $H_2S$, then treated with a chemical such as monoethanolamine, which requires capital equipment costing from about eight to ten million U.S. dollars. However, contact with chlorine dioxide will also remove thiophene. The capital cost of the equipment required in the present invention is less than one hundred thousand U.S. dollars. Thus, the value of the present invention is readily apparent.

"Pellets" as used throughout this specification and claims means: pellets, lumps, nodules, pieces, granules, agglomerated particulates, and the like, which are small enough to flow through a direct reduction furnace and to have sufficient surface area to react with reducing gas passing therethrough, yet large enough to support the weight of the burden. Finely divided material or fines, which would plug the interstices between the pellets, blocking the gas passageway around them, are not included in the definition of pellets.

"Metallized" as used throughout this specification, does not mean coated with metal, but means nearly completely reduced to the metallic state, i.e., always in excess of 60% metal, and usually in excess of 90% metal in the material. Such metallized iron in many forms, including pellets and lump, is well suited as feed material to steelmaking furnaces such as an electric arc furnace.

Although the invention has been disclosed and described with respect to a process for the direct reduction of iron oxide to form metallized iron, other metal oxide ores such as nickel or cobalt oxide, for example, can be reduced to the metallized state using the disclosed process and apparatus. All such alternative uses of the disclosed process and apparatus are within the scope of the invention.

SUMMARY OF THE ACHIEVEMENT OF THE OBJECTS OF THE INVENTION

From the foregoing, it is readily apparent that we have invented an improved method and apparatus for removing sulfur compounds from spent process gas in the direct reduction of sulfur-containing metal ores which results in a low-sulfur metallized product, and which reduces sulfur contamination of catalyst in an associated stoichiometric reformer.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. In a process for producing metallized pellets by direct reduction of metal oxide, the method including the steps of passing a reducing gas through a furnace having an upper reducing zone and a lower discharge zone, and containing sulfur-containing metal oxide material therein, reacting said reducing gas with said metal oxide material to produce metallized pellets and a sulfur-containing spent reducing gas, removing said spent reducing gas containing sulfur-containing components from said furnace, cooling and scrubbing said spent reducing gas to form cooled and scrubbed spent reducing gas as a reformer feed gas, reforming said reformer feed gas into an effective reducing gas, and introducing said reducing gas into said reducing zone;

the improvement comprising the additional steps of mixing said cooled and scrubbed spent reducing gas with a fuel gas to form said reformer feed gas, introducing chlorine dioxide into said cooled and scrubbed spent reducing gas and into said fuel gas, reacting the sulfur containing components of said spent reducing gas and said fuel gas with chlorine dioxide, thereby reducing the sulfur content of said reformer feed gas, removing the sulfur-containing reaction products, and producing a cooled sulfur lean gas stream.

2. A process according to claim 1, wherein the chlorine dioxide is in aqueous solution.

3. A process according to claim 2, wherein the sulfur-containing components in the spent reducing gas and in said fuel gas react with chlorine dioxide to form soluble compounds, further comprising removing the soluble compounds from the gas stream in aqueous solution.

4. A process according to claim 3, further comprising compressing the spent reducing gas and the fuel gas prior to removing the soluble compounds.

5. A process according to claim 1, introducing the cooled sulfur lean gas stream into the discharge zone.

6. A process according to claim 1, further comprising passing the cooled sulfur lean gas stream through the discharge zone as cooling gas to contact and cool said metallized pellets prior to reforming said spent reducing gas.

7. A process according to claim 1 wherein said metal is selected from the group consisting of iron, nickel and cobalt.

8. A process according to claim 1, wherein sulfur-containing fuel is added to the cooled and scrubbed spent reducing gas to form the reformer feed gas prior to introduction of chlorine dioxide.

9. A process according to claim 8 wherein the sulfur-containing fuel is selected form the group consisting of coke oven gas, producer gas, natural gas, and carbureted water gas.

10. Apparatus for the direct reduction of metal oxide pellets to form metallized pellets, comprising:

a) a shaft furnace having an upper and lower end, said shaft furnace having means for charging metal oxide and carrying a gravitationally descending burden therein;

b) a hot gas reformer for producing reducing gas;

c) means for introducing reducing gas from said reformer into said furnace to react with said burden to produce spent reducing gas and metallized pellets;

d) spent process gas removal means at the upper end of said furnace;

e) cooler-scrubber means communicating with said spent reducing gas removal means for cooling and scrubbing said spent reducing gas;

f) means for injecting chlorine dioxide into the spent reducing gas to reduce the sulfur content of said spent reducing gas;

g) a source of sulfur-containing process fuel gas;

h) means for injecting chlorine dioxide into the sulfur-containing process fuel gas to reduce the sulfur content of said fuel gas;

i) means for mixing said process fuel gas with said spent reducing gas to form a low-sulfur reformer feed gas mixture; and j) means for cycling said reformer feed gas mixture through said gas reformer to produce said reducing gas.

11. Apparatus according to claim 10, wherein said furnace has a lower cooling zone, further comprising means for passing said low sulfur reformer feed gas mixture through said cooling zone as cooling gas.

12. Apparatus according to claim 10, further comprising means for compressing said spent reducing gas, wherein said means for injecting chlorine dioxide into the spent reducing gas communicates with said compressor means.

13. Apparatus according to claim 11 further comprising additional means for cooling the reduced sulfur content spent reducing gas.

14. Apparatus according to claim 11 further comprising additional means for humidifying the reduced sulfur content spent reducing gas.

15. Apparatus according to claim 10 further comprising means for intimately contacting said injected chlorine dioxide with said spent reducing gas, and means for removal of water and water-soluble products therefrom.

16. Apparatus according to claim 10 further comprising means for monitoring the content of residual chlorine dioxide and residual sulfides in said spent reducing gas downstream from said chlorine dioxide injection means.

17. Apparatus according to claim 10 wherein said means for mixing said sulfur-containing process fuel gas is located between said cooler-scrubber means and said chlorine dioxide injection means.

18. Apparatus according to claim 10 further comprising means for injecting chlorine dioxide into said sulfur-containing process fuel gas between said source of sulfur-containing process fuel gas and means for mixing said process fuel gas with said spent reducing gas.

* * * * *